H. E. WHITE.
MOTOR CONTROL SYSTEM.
APPLICATION FILED JUNE 23, 1909.
941,397.
Patented Nov. 30, 1909.
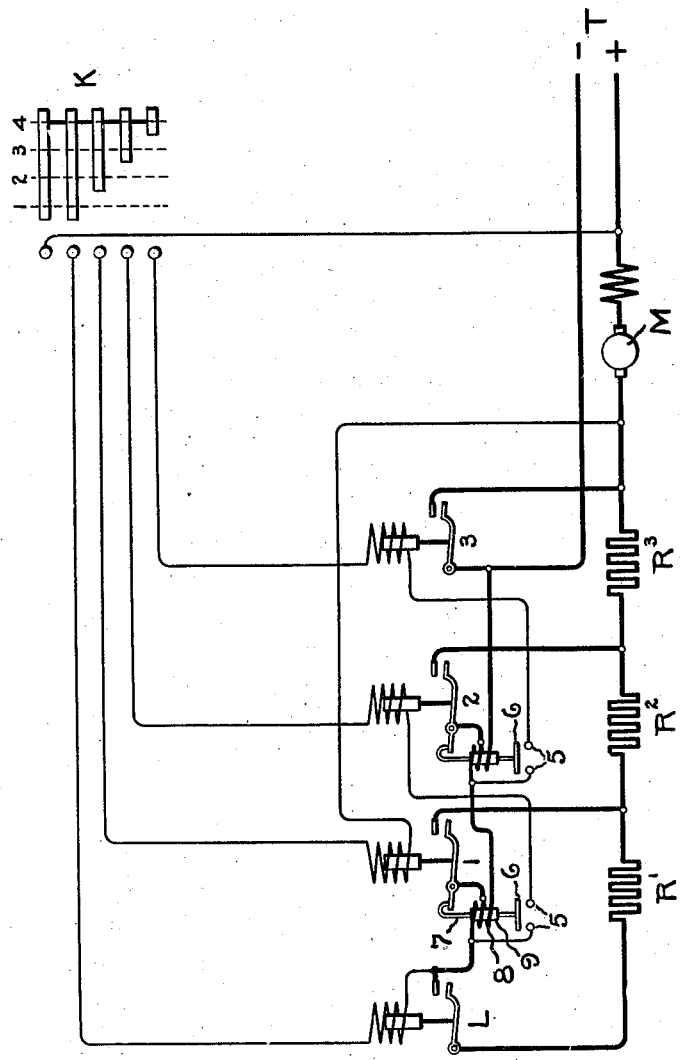
WITNESSES:
INVENTOR
HAROLD E. WHITE.
BY
ATT'Y.

UNITED STATES PATENT OFFICE.

HAROLD E. WHITE, OF SCHENECTADY, NEW YORK, ASSIGNOR TO GENERAL ELECTRIC COMPANY, A CORPORATION OF NEW YORK.

MOTOR-CONTROL SYSTEM.

941,397.   Specification of Letters Patent.   Patented Nov. 30, 1909.

Application filed June 23, 1909. Serial No. 503,834.

*To all whom it may concern:*

Be it known that I, HAROLD E. WHITE, a citizen of the United States, residing at Schenectady, in the county of Schenectady, State of New York, have invented certain new and useful Improvements in Motor-Control Systems, of which the following is a specification.

My invention relates to motor control systems and particularly to those in which a plurality of electrically controlled switches or contactors are arranged for operation in succession to increase step-by-step the voltage applied to the motor in starting. In such motor control systems means is often provided for insuring a time interval between the closing of successive contactors in order that the voltage applied to the motor may not be increased too rapidly. Instead of or in addition to the "time limit" means just referred to, devices are often provided which operate in response to the current in the motor circuit and prevent the closing of a succeeding contactor until the current in the motor circuit, which has temporarily increased owing to the closing of the preceding contactor, has fallen below a certain value. In certain control systems heretofore used the contactors which are intended to close in succession are provided with auxiliary switches which control the control circuit for the succeeding contactor, and the closing of the contactors in their proper order is thereby assured. An overload responsive device is often used with such systems in order to control the successive closing of the contactors as explained above. It has been found that, under certain conditions, the first voltage increasing contactor may close directly after the closing of the motor circuit before the overload responsive device has had time to become effective, the result being that the voltage applied to the motor initially exceeds the desired amount.

I have devised my invention particularly for use in connection with a system of motor control of the general type covered by my co-pending application, Serial No. 480,481, filed February 27, 1909, and assigned to the same assignee as this application, and it is particularly useful in connection with a system of that kind. I do not wish to be understood, however, as limiting it to this type of control, since it may obviously be used in connection with many others. In the system shown in the above named application, the contactors which initially complete the motor circuit are provided with auxiliary switches which control the control circuit for the voltage increasing contactors, these auxiliary switches being held open while their corresponding contactor is open and being allowed to close when said contactor closes, unless the current in the motor circuit exceeds a certain value. In order to maintain said auxiliary switches open until their contactors have closed, shunt coils were provided, adjacent the series coils on the auxiliary switch attachments, which were maintained energized during most of the closing movement of said contactors, but were deënergized when the latter had completely closed. By my present arrangement I am able to do away altogether with the auxiliary switch attachments on the line contactors, thereby much simplifying the whole control system.

Considered in connection with the system of control covered in my application above mentioned, my invention consists in connecting the actuating coil of the first voltage increasing contactor in shunt to the motor, the actuating coils of the succeeding voltage increasing contactors being connected to a source of current through auxiliary switches on the preceding contactors exactly as in the system shown in my prior application above mentioned. With such an arrangement the first voltage increasing contactor will not close after the completion of the motor circuit, until the counter electromotive force of the motor has increased to a certain value. In this way the proper operation of the contactors is assured.

In the accompanying drawing I have illustrated diagrammatically a simple system of motor control of the type shown in my above mentioned application having my invention embodied therein.

The motor to be controlled is indicated at M as of the series type, although it might equally well be of any other. The source of current supply both for the motor and for the control circuits is indicated at T. The voltage applied to the motor in starting is increased by cutting out successively three sections of starting resistance $R^1$, $R^2$ and $R^3$. A line switch L is arranged when closed to complete a circuit from the source T through the resistance $R^1$, $R^2$, $R^3$ and the motor M.

The sections of resistance R¹, R² and R³ are short-circuited by contactors 1, 2 and 3, which may be of any suitable design, of these 1 and 2 being provided with auxiliary switch attachments of the kind shown and described in my co-pending application, Serial No. 480,481, filed Feb. 27, 1909, above referred to. Briefly stated, these auxiliary switch attachments each comprise fixed contacts 5 bridged by a movable contact 6 carried by a rod 7 mechanically connected to the movable member of the contactor, so that when the latter is in its open position the contacts 5 and 6 will be held open and when the movable member of the contactor is in its closed position said contacts 5 and 6 will be permitted to close, unless the rod 7 is maintained in its raised position by the magnetizing effect of a coil 8 which surrounds a core of magnetic material 9 carried by the rod 7. The master switch K is shown in the usual conventional manner as being of the type in which a number of segments electrically connected together coöperate with fixed contact fingers. The master switch K has four positions, the first serving to close the line switch L, while the second, third and fourth, respectively, control the closing of the resistance controlling contactors 1, 2 and 3. The arrangement of control circuits for the actuating coils of the line switch L and the resistance controlling contactors 1, 2 and 3 will be clear from the diagram, it being noted that the master switch serves to connect the actuating coil of the line switch L to the source of current T; to connect the actuating coil of the first resistance controlling contactor 1 in shunt to the motor M; and to connect the actuating coils of the resistance controlling contactor 2 and 3 to the source through the auxiliary switches coöperating, respectively, with the contactors 1 and 2. As in the case of the control system shown in my co-pending application above referred to, the contactors 1 and 2 in closing short-circuit not only the sections of resistance controlled by them, but also a portion of the magnetizing coils of their auxiliary switch attachments.

The operation of the control system shown will be obvious from the foregoing and from an inspection of the diagram. It may be stated, however, that when the master switch K is thrown to its first position, the line switch L is closed. Movement of the master switch to the second position connects the actuating coil of the contactor 1 in shunt to the motor, and this contactor will close when the counter electromotive force of the motor has risen to a certain value, owing to increase of speed of the motor. Upon the closing of the contactor 1 its auxiliary switch is free to close unless maintained open by the magnetizing effect of the lower part of the coil 8, which is still energized by motor current. If the master switch is thrown to its third position the actuating coil of the switch 2 will be energized as soon as the auxiliary switch coöperating with the contactor 1 closes, and in a similar manner when the switch K is thrown to its fourth position the actuating coil of the contactor 3 will be energized as soon as the auxiliary switch coöperating with the contactor 2 has closed. It will, of course, be understood that the master switch K may be thrown immediately to its fourth position and that the closing of the line switch L and the resistance controlling contactors 1, 2 and 3 will take place automatically.

It is my intention to cover in the appended claims all modifications which come within the scope of my invention.

What I claim as new and desire to secure by Letters Patent of the United States, is,

1. In a motor control system, a motor to be controlled, a plurality of contactors intended for operation in succession to increase step-by-step the voltage applied to the motor in starting, means for connecting the actuating coil of the first contactor in shunt to the motor, and auxiliary switches coöperating with said contactors and arranged to control the energization of the actuating coil of the succeeding contactor.

2. In a motor control system, a motor to be controlled, a plurality of contactors intended for operation in succession to increase step-by-step the voltage applied to the motor in starting, and means for controlling the energization of the actuating coils of said contactors comprising control circuits for connecting the actuating coil of the first contactor in shunt to the motor and the actuating coils of the succeeding contactors to a source of current, and auxiliary switches coöperating with certain of said contactors arranged to control the operation of a succeeding contactor.

3. In a motor control system, a motor to be controlled, a plurality of contactors intended for operation in succession to increase step-by-step the voltage applied to the motor in starting, means for connecting the actuating coil of the first contactor in shunt to the motor, auxiliary switches coöperating with said contactors each arranged to control the operation of a succeeding contactor, and means responsive to the current in the motor circuit for controlling the closing of said auxiliary switches.

4. In a motor control system, a motor to be controlled, a plurality of contactors intended for operation in succession to increase step-by-step the voltage applied to the motor in starting, a control circuit for the first contactor for connecting the actuating coil of the same in shunt to the motor, auxiliary switches coöperating with certain of said contactors each arranged to control the operation of a succeeding contactor, a connection between each of said contactors and its auxiliary switch whereby when the former is open the latter is positively held open and when the former is closed the latter is permitted to close, and means responsive to current in the motor circuit for controlling the closing of said auxiliary switches.

5. In a control system, a motor to be controlled, a plurality of contactors intended for operation in succession to increase step-by-step the voltage applied to the motor, a master switch for controlling the energization of the actuating coils of said contactors, a control circuit whereby said master switch connects the actuating coil of the first contactor in shunt to the motor, control circuits whereby said master switch connects the actuating coils of the succeeding contactors to a source of current, auxiliary switches coöperating with certain of said contactors each arranged to control the control circuit to the actuating coil of the succeeding contactor, a connection between each of said contactors and its auxiliary switch whereby when the former is open the latter is positively held open and when the former is closed the latter is permitted to close, and means responsive to current in the motor circuit for controlling the closing of said auxiliary switches.

In witness whereof, I have hereunto set my hand this 22nd day of June, 1909.

HAROLD E. WHITE.

Witnesses:
BENJAMIN B. HULL,
HELEN ORFORD.